United States Patent
Oran

(10) Patent No.: US 9,143,722 B2
(45) Date of Patent: Sep. 22, 2015

(54) METHOD AND APPARATUS FOR PROVIDING SESSION DESCRIPTION FOR A MEDIA SESSION

(75) Inventor: David R. Oran, Action, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 289 days.

(21) Appl. No.: 13/302,108

(22) Filed: Nov. 22, 2011

(65) Prior Publication Data

US 2013/0132588 A1   May 23, 2013

(51) Int. Cl.
| | | |
|---|---|---|
| G06F 15/16 | (2006.01) | |
| H04N 7/14 | (2006.01) | |
| H04L 29/08 | (2006.01) | |
| H04L 29/06 | (2006.01) | |

(52) U.S. Cl.
CPC ............. *H04N 7/141* (2013.01); *H04L 65/608* (2013.01); *H04L 67/2804* (2013.01)

(58) Field of Classification Search
CPC .................................................... H04L 65/608
USPC ........................................................ 709/227
See application file for complete search history.

(56) References Cited

U.S. PATENT DOCUMENTS

| | | | | |
|---|---|---|---|---|
| 6,934,756 B2 * | 8/2005 | Maes | .............................. | 709/227 |
| 6,990,512 B1 * | 1/2006 | Major et al. | ................... | 709/203 |
| 7,197,049 B2 * | 3/2007 | Engstrom et al. | ............. | 370/469 |
| 7,406,696 B2 * | 7/2008 | Burger et al. | ................. | 719/318 |
| 7,454,510 B2 * | 11/2008 | Kleyman et al. | .............. | 709/231 |
| 7,694,127 B2 * | 4/2010 | Adams et al. | ................. | 713/151 |
| 7,936,695 B2 | 5/2011 | Oran | | |
| 8,442,035 B2 * | 5/2013 | Ballard et al. | ................ | 370/352 |
| 8,526,315 B2 * | 9/2013 | Xu et al. | ........................ | 370/252 |
| 8,549,151 B2 * | 10/2013 | Stokking et al. | ............. | 709/227 |
| 8,667,164 B2 * | 3/2014 | Keum et al. | ................... | 709/231 |
| 9,032,082 B2 * | 5/2015 | Xie | ................ | 709/228 |
| 2004/0148400 A1 * | 7/2004 | Mostafa | ........................ | 709/227 |
| 2004/0205338 A1 * | 10/2004 | Bertin | ......................... | 713/163 |
| 2004/0244010 A1 * | 12/2004 | Kleyman et al. | ............. | 719/318 |
| 2005/0005025 A1 * | 1/2005 | Harville et al. | ............... | 709/241 |
| 2005/0060411 A1 * | 3/2005 | Coulombe et al. | ........... | 709/227 |
| 2005/0083909 A1 * | 4/2005 | Kuusinen et al. | ............. | 370/352 |
| 2005/0091190 A1 * | 4/2005 | Klemets | ........................... | 707/1 |
| 2006/0203831 A1 * | 9/2006 | Yoshizawa et al. | ........... | 370/401 |
| 2006/0274730 A1 * | 12/2006 | Medlock et al. | .............. | 370/352 |
| 2008/0043717 A1 * | 2/2008 | Bellora et al. | ................ | 370/352 |
| 2008/0285452 A1 | 11/2008 | Oran | | |
| 2008/0288458 A1 * | 11/2008 | Sun et al. | ......................... | 707/3 |
| 2009/0094376 A1 * | 4/2009 | Kosiba | .......................... | 709/231 |
| 2009/0164655 A1 * | 6/2009 | Pettersson et al. | ............ | 709/231 |

(Continued)

OTHER PUBLICATIONS

IETF RFC 3986, "Uniform Resource Identifier (URI): Generic Syntax", T. Berners-Lee et al., Jan. 2005.

(Continued)

*Primary Examiner* — Guang Li
(74) *Attorney, Agent, or Firm* — Cindy Kaplan

(57) ABSTRACT

In one embodiment, a method includes constructing at a source node, a session description pointer to a session description for a media session, inserting the session description pointer in a packet in a media stream of the media session, and transmitting the packet to a receiver node. The session description pointer is configured for use in obtaining the session description by an intermediate node located between the source node and the receiver node. An apparatus is also disclosed.

19 Claims, 6 Drawing Sheets

(56) References Cited

U.S. PATENT DOCUMENTS

| | | | |
|---|---|---|---|
| 2010/0121963 A1* | 5/2010 | Peng et al. | 709/228 |
| 2010/0135282 A1* | 6/2010 | Feng et al. | 370/352 |
| 2011/0107082 A1* | 5/2011 | Blom et al. | 713/150 |
| 2011/0167164 A1* | 7/2011 | Fernandez Gutierrez | 709/228 |
| 2011/0191469 A1 | 8/2011 | Oran | |
| 2012/0089740 A1* | 4/2012 | Yin et al. | 709/227 |

OTHER PUBLICATIONS

IETF RFC 2543 "SIP: Session Initiation Protocol", M. Handley et al., Mar. 1999.

IETF RFC 2326, "Real Time Streaming Protocol 2.0", H. Schulzrinne, Apr. 1998.

IETF RFC 4566, "SDP: Session Description Protocol", M. Handley et al., Jul. 2006.

IETF RFC 3261, "SIP: Session Initiation Protocol", J. Rosenberg et al., Jun. 2002.

IETF RFC 1889, "RTP: A Transport Protocol for Real-Time Applications", H. Schulzrinne et al., Jan. 1996.

IETF RFC 2327, "SDP: Session Description Protocol", M. Handley et al., Apr. 1998.

IETF RFC 3550, "RTP: A Transport Protocol for Real-Time Applications", H. Schulzrinne et al., Jul. 2003.

IETF RFC 3305, "Uniform Resource Identifiers (URIs), URLs, and Uniform Resource Names", M. Mealling et al., Aug. 2002.

\* cited by examiner

METHOD AND APPARATUS FOR PROVIDING SESSION DESCRIPTION FOR A MEDIA SESSION

TECHNICAL FIELD

The present disclosure relates generally to communication networks, and more particularly, to providing session description for a media session.

BACKGROUND

Transport protocols such as Real-time Transport Protocol (RTP) are used to stream audio, video, text, and other real-time data in a wide range of applications including, for example, entertainment, conferencing, VoIP (Voice over IP (Internet Protocol)), and media processing. RTP media streams are not self-describing. In order to understand their structure and content, separate metadata structures are needed. A number of protocols may be used to communicate session details to endpoints of the media session. However, these protocols operate out-of-band and in the control plane. This makes it difficult for an intermediate node in the network to monitor the media stream.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
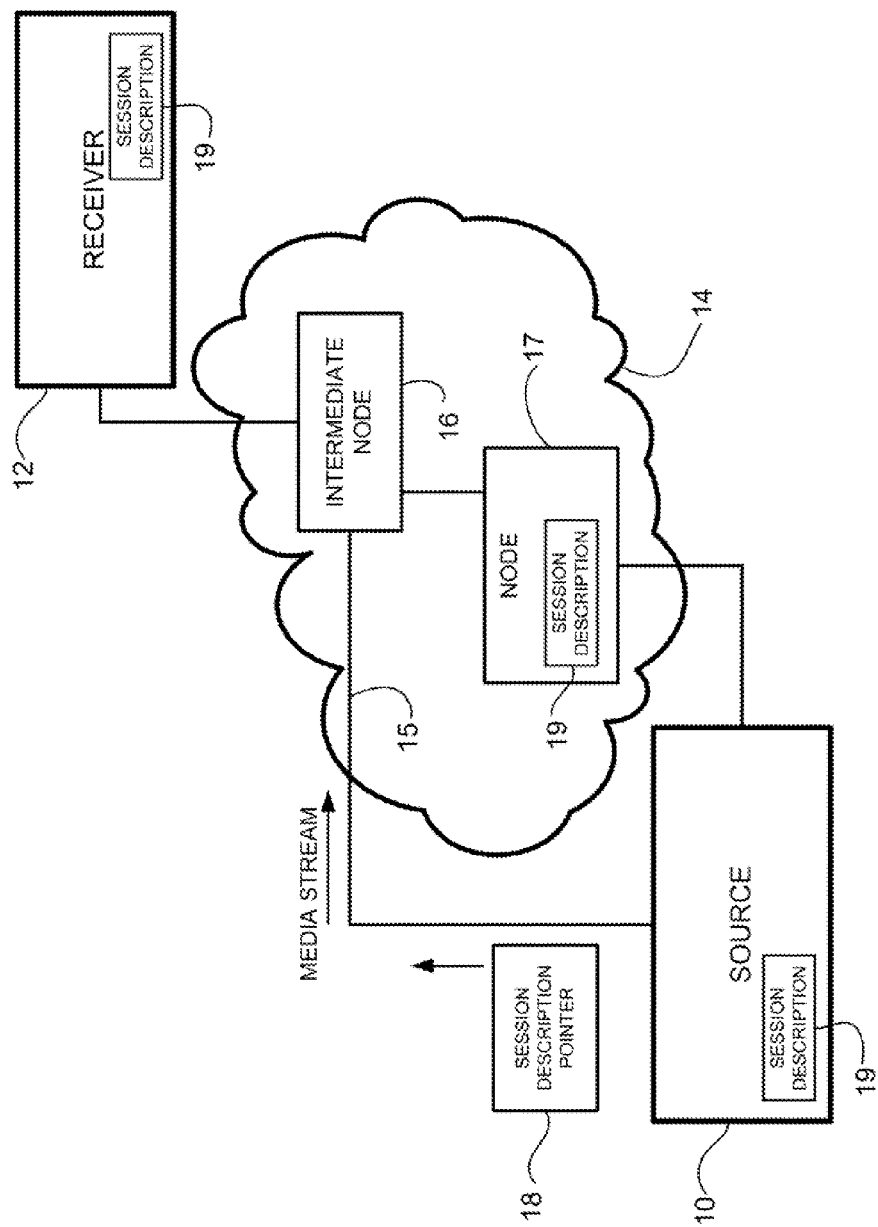
FIG. 1 illustrates an example of a network in which embodiments described herein may be implemented.

In one embodiment, a method generally comprises constructing at a source node, a session description pointer to a session description for a media session, inserting the session description pointer in a packet in a media stream of the media session, and transmitting the packet to a receiver node. The session description pointer is configured for use in obtaining the session description by an intermediate node located between the source node and the receiver node.

In another embodiment, an apparatus generally comprises a processor for processing a packet received from a source of a media session in a media stream and containing a session description pointer to a session description for the media session, transmitting a request for the session description using the session description pointer, and processing the session description for use in interpreting the media stream at an intermediate node located between the source and a receiver. The apparatus further comprises memory for storing the session description.

In yet another embodiment, an apparatus generally comprises a processor for constructing a session description pointer to a session description for a media session, inserting the session description pointer in a packet in a media stream of the media session, and transmitting the packet to a receiver node. The apparatus further comprises memory for storing the session description. The session description pointer is configured for use in obtaining the session description by an intermediate node located between the apparatus and the receiver node.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Media streams are transmitted in a session between a source node and one or more receiver nodes. There may be any number of intermediate nodes (e.g., middle boxes) located between the source and receiver nodes. Monitoring of the media streams in intermediate nodes increases the ability to identify and diagnose faults in the network. However, media stream protocols such as RTP (Real-time Transport Protocol) do not provide the media session description information required to interpret the structure and content of the media stream. Protocols that operate independently in the control plane are typically used to convey the information needed to understand the structure and content of the media stream. This arrangement makes it difficult for an intermediate node to monitor the media streams.

The embodiments described herein provide session description (metadata) for a media session to intermediate nodes by including a session description pointer in the media stream. Information in a stream pointing to separate data structures needed to interpret a stream are called "back-maps". The back-maps point in the opposite direction from the usual pointers, which map from the description to the stream rather than from the stream to the description. In one embodiment, back-mapping data is inserted in an RTP/RTCP (Real-time Transport Control Protocol) stream by a source node. This allows intermediate nodes to retrieve the session description and perform sophisticated analysis of the media stream that is made possible by having access to the metadata for the session. There is no pre-knowledge required by the intermediate node of the metadata through a push-based protocol or static configuration.

Referring now to the drawings, and first to FIG. 1, an example of a network in which embodiments described herein may be implemented is shown. The network includes a communication system comprising a media source 10 and receiver 12 in communication over a network 14. The network 14 may include one or more networks (e.g., local area network, metropolitan area network, wide area network, enterprise network, Internet, intranet, radio access network, public switched network, or any other network or combination of networks). The source node 10 and receiver node 12 are connected via communication links 15 and one or more intermediate nodes 16. For simplification, only one intermediate node 16 is shown, however, the media flow path between the source 10 and receiver 12 may include any number or type of intermediate nodes (e.g., routers, switches, gateways, or other network devices), which facilitate passage of data between the endpoints. Also, there may be any number of sources 10 or receivers 12.

The source 10 sends packets in a media stream to any combination of receivers 12 via the network 14. The media stream may include content such as audio, video, text, or other data. The source 10 and receiver 12 are configured to originate or terminate communications over the network 14. The source 10 and receiver 12 may be any device or combination of devices configured for receiving, transmitting, or receiving and transmitting media streams. The media source 10 may be, for example, a server that stores the media locally or receives the media from another server or media source via another network, satellite, cable, or any other communication device. The receiver 12 may be, for example, a personal computer, set-top box, personal digital assistant (PDA), VoIP phone, tablet, Internet connected television, cellular telephone, telepresence device, media center device, or any other network device that receives media packets.

As described in detail below, the source 10 transmits a session description pointer 18 in a packet (i.e., media packet, control packet) in a media stream of the media session using a media transport protocol (e.g., RTP, RTCP). The term 'media stream' as used herein includes media packets (e.g., RTP packets) and control packets (e.g., RTCP packets) associated with the media packets and providing control information for the media flow. The session description pointer 18 provides information used to obtain the session description (metadata) 19 from either one of the endpoints (source 10, receiver 12) or another device such as node 17 in communication with the intermediate node 16 and having the session description or able to reconstruct it. The node 17 containing the session description 19 may be located in the same network as the intermediate node 16 or another network and may be in communication with the media source 10, receiver 12, or other node containing the session description. In one embodiment, the session description pointer 18 comprises a URI (Uniform Resource Identifier) that can be resolved by a system monitoring the stream to identify a location of the session description. Examples of the URI and methods for encoding the URI in the media stream are described below.

It is to be understood that the network shown in FIG. 1 and described herein is only an example and that the embodiments may be implemented in networks having different network topologies or network devices, without departing from the scope of the embodiments.

Figure 2:
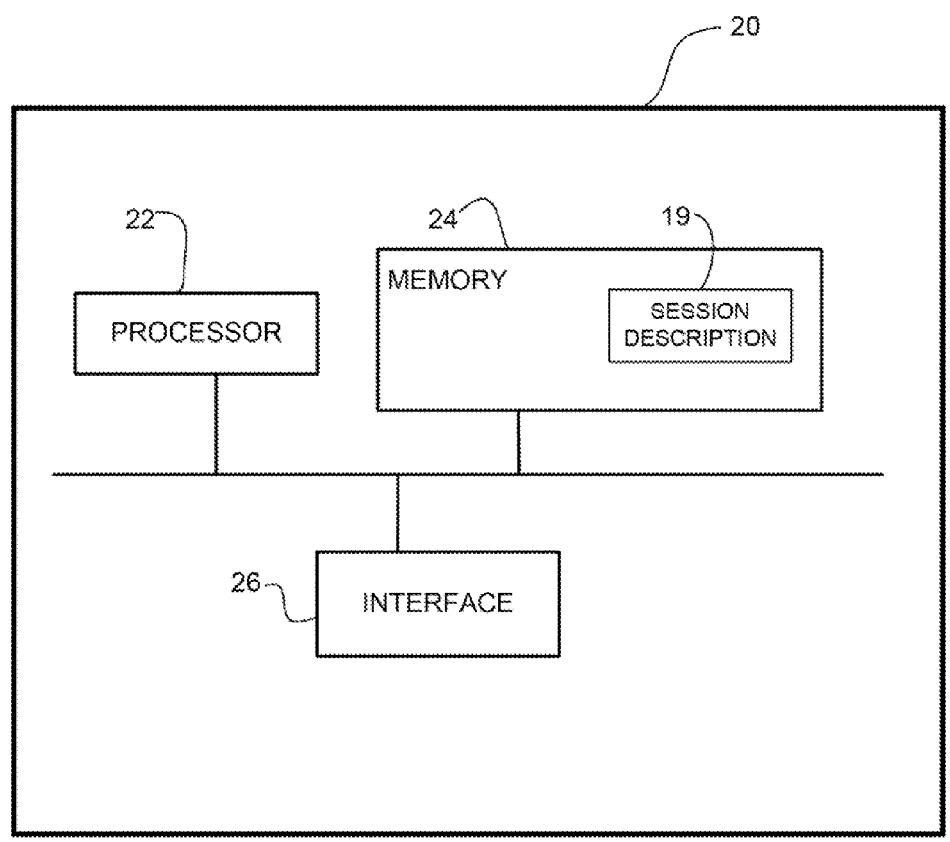
FIG. 2 depicts an example of a network device useful in implementing embodiments described herein.

FIG. 2 illustrates an example of a network device (e.g., source node, receiver node, intermediate node) 20 that may be used to implement the embodiments described herein. In one embodiment, the network device 20 is a programmable machine that may be implemented in hardware, software, or any combination thereof. The network device 20 includes one or more processor 22, memory 24, and network interface 26. Memory 24 may be a volatile memory or non-volatile storage, which stores various applications, operating systems, modules, and data for execution and use by the processor 22. For example, the memory 24 may store the session description 19. The session description pointer 18 may also be stored in memory 24.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interface 26 may comprise any number of interfaces (linecards, ports) for receiving data or transmitting data to other devices. The interface 26 may include, for example, an Ethernet interface for connection to a computer or network.

It is to be understood that the network device 20 shown in FIG. 2 and described above is only an example and that different configurations of network devices may be used. For example, the network device 20 may further include any suitable combination of hardware, software, algorithms, processors, DSPs (digital signal processors), devices, components, or elements operable to facilitate the capabilities described herein.

Figure 3:
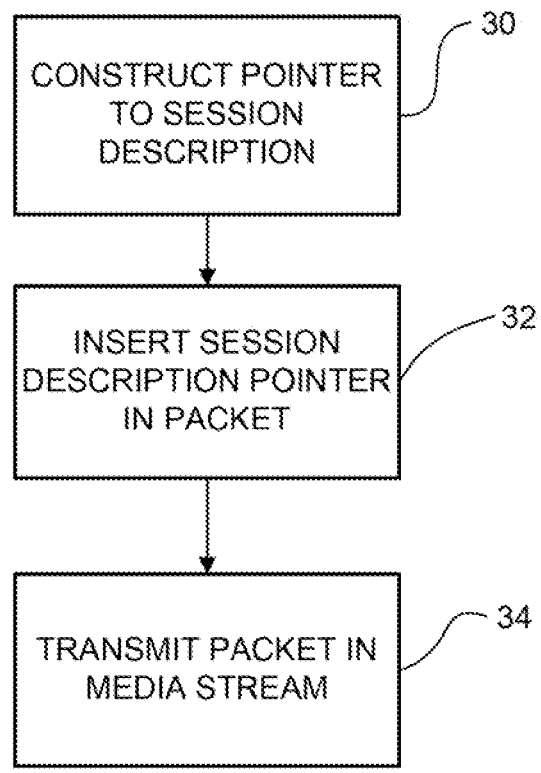
FIG. 3 is a flowchart illustrating an overview of a process for constructing and transmitting a session description pointer, in accordance with one embodiment.

FIG. 3 is a flowchart illustrating an overview of a process for providing the session description pointer 18 to the intermediate node 16, in accordance with one embodiment. At step 30, the media source 10 constructs the session description pointer 18. The pointer 18 is inserted into a packet (e.g., RTP packet, RTCP packet) in the media stream (step 32) and transmitted to the receiver 12 (step 34). The session description pointer 18 is configured for use in obtaining the session description 19 by the intermediate node 16 located between the source node 10 and the receiver node 12.

Figure 4:
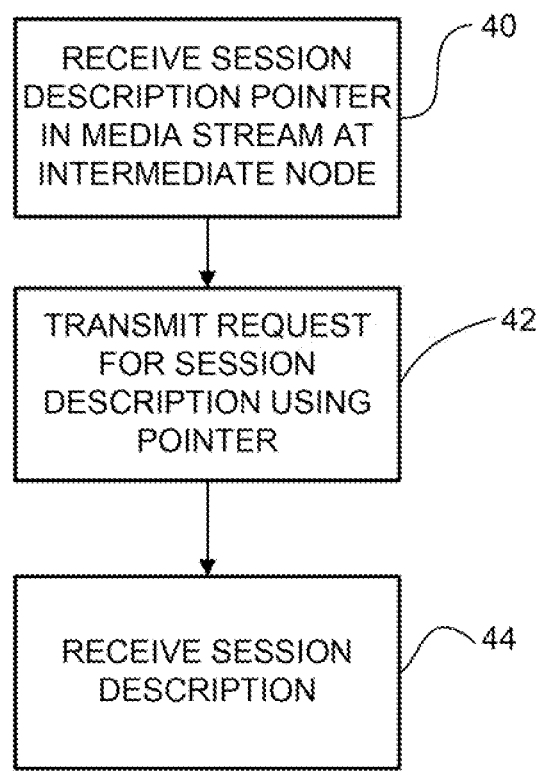
FIG. 4 is a flowchart illustrating a process for obtaining session description for a media session using the session description pointer, in accordance with one embodiment.

FIG. 4 is a flowchart illustrating an overview of a process for obtaining the session description 19 using the session description pointer 18, in accordance with one embodiment. At step 40, the intermediate node 16 receives the session description pointer 18 in a media stream that the node receives from the source 10 and transmits to the receiver 12. As described below, the session description pointer 18 may be located in a media packet or control packet in the media stream. The node 16 transmits a request for the session description 19 using the session description pointer 18 (step 42) and receives the session description (step 44). The request may be transmitted using, for example, HTTP (Hypertext Transfer Protocol), or any other suitable request/response protocol. The node 16 may then use the session description 19 to interpret the structure and content of the media stream and perform analysis on the media stream or transmit information about the media stream to a central monitoring node.

It is to be understood that the processes shown in FIGS. 3 and 4 and described above are only examples and that steps may be added without departing from the scope of the embodiments.

The media stream may be identified, for example, using a form of DPI (Deep Packet Inspection) or configured IP 5-tuples defining the stream. Once the media stream is identified, the intermediate node 16 can locate the session description pointer 18 in one of the media packets or control packets and use the pointer to obtain the session description 19. The session description 19 may provide session details including, for example, protocol, originator and session identifier, session name, and other session description metadata.

As previously described, the pointer 18 is used to fetch session description 19 from one of the endpoints (source 10, receiver 12) or a third party (node 17) having the metadata or able to reconstruct it. In one embodiment, the session description pointer 18 comprises a URI (Uniform Resource Identifier) that can be resolved by the system monitoring the stream. The URI may be any string of characters used to identify a resource in the network. The form of the URI may vary depending on the network control protocol used.

The following describes examples of URI configurations for use with SIP (Session Initiation Protocol), SAP (Session Announcement Protocol)/SDP (Session Description Protocol), or RTSP (Real-Time Streaming Protocol). It is to be understood that these are only examples and that other formats or protocols may be used without departing from the scope of the embodiments.

For SIP, an SIP URI such as described in IETF RFC 3261, "SIP: Session Initiation Protocol", J. Rosenberg et al., June 2002, may be used. The SIP URI points to one of the session participants to fetch the metadata either with an Options request or a request to join the session, for example.

SAP (or any multicast use of RTP) may use SDP, which provides a URI pointing to a web server holding a copy of the SDP as a MIME object (see, for example, IETF RFC 4566, "SDP: Session Description Protocol", M. Handley et al., July 2006).

RTSP may use an RTSP URL (Uniform Resource Locator) resolving to the RTSP server for the session. An RTSP Describe request including the RTSP URL may be used to request the session description (see, for example, IETF RFC 2326, "Real Time Streaming Protocol (RTSP)", H. Schulzrinne et al., April 1998).

As described above, the session description pointer 18 is embedded in the media stream. In one embodiment, RTP is used as the transport protocol for delivering the media stream. RTCP is used together with RTP to provide control information and statistics. RTP/RTCP provide end-to-end network transport functions suitable for applications transmitting real-time data, such as audio, video, text, or other data, over multicast or unicast network services. The ports which form the RTP session may be negotiated using other protocols such as RTSP, SDP, and SIP, for example.

Figure 5:
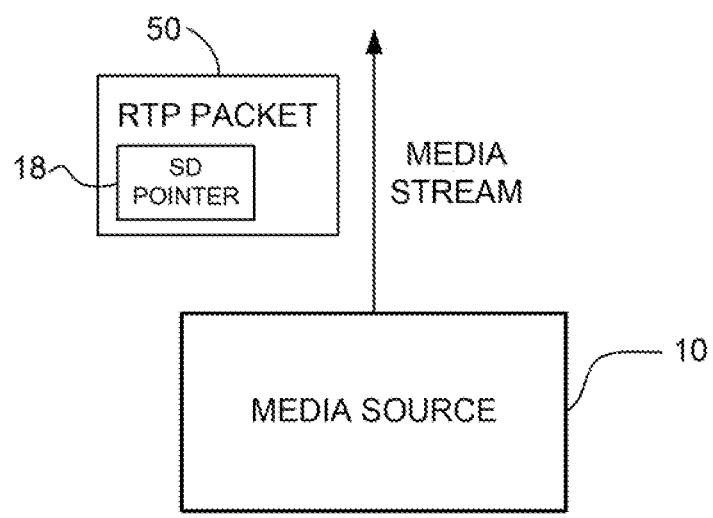
FIG. 5 illustrates an example of transmitting the session description pointer in a media packet in the media stream.

In one embodiment, the session description pointer 18 is encoded in the media stream in an RTP packet 50, as shown in FIG. 5. A new static RTP payload format may be defined, which has the URI as its data.

Figure 6:
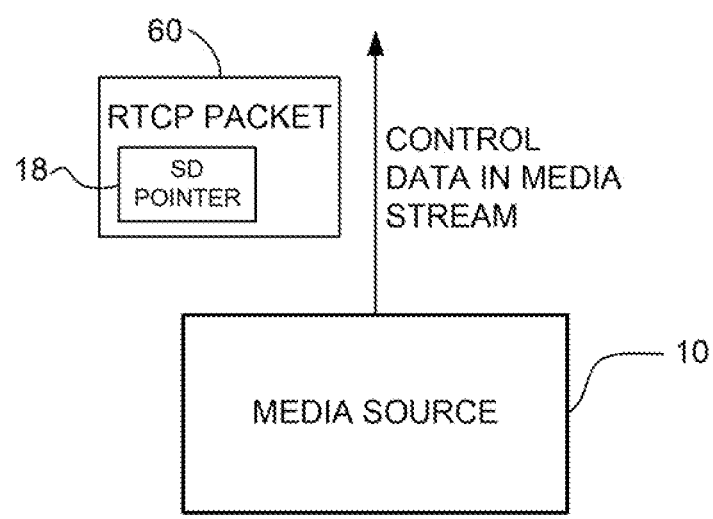
FIG. 6 illustrates an example of transmitting the session description pointer in a control packet in the media stream.

In another embodiment, the session description pointer 18 is encoded in an RTCP packet 60, as shown in FIG. 6. The packet may be similar to an SDES (Source Description) message used to send items or information to session participants, and contain the URI, for example.

When using RTCP to transmit the URI, the node needs to identify the correspondence between the RTP and RTCP flows. In cases in which port multiplexing is being used, RTCP traffic is on the same stream as RTP traffic, therefore, the node can easily identify the correspondence between the RTP and RTCP traffic. In the case where the endpoints follow the even/odd port pair convention and there are no RTP unaware Network Address Translations (NATs) that change the port allocations, the node can also identify the correspondence between the RTP and RTCP flows. For example, RTP may be originated and received on even port numbers while the associated RTCP communication uses the next higher odd port number.

Packets containing the session description pointer (URI) 18 are preferably sent generally as often as RTCP sender reports (or receiver reports) are transmitted. Sender and receiver report packets are typically sent as often as bandwidth constraints allow, to maximize resolution of statistics. This is sufficient because even the RTP endpoints can sometimes not usefully consume a stream until the RTCP data is available. The URIs may be shortened by a number of well-known techniques so that there is not a reason to send the information less frequently. Packets containing the URI can also be piggybacked using compound RTCP packets, for example. Multiple RTCP packets may be, concatenated without any intervening separators to form a compound RTCP packet that is sent in a single packet of the lower layer protocol.

It is to be understood that the protocols described herein to define and transmit the session description pointers are only examples and that other protocols may be used without departing from the scope of the embodiments. For example, media transport protocols other than RTP/RTCP, including proprietary protocols, may be used to transmit the session description pointer.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
constructing at a source node in a media session, a session description pointer to a session description for the media session, the session description pointer comprising back-map data pointing from a media stream to said session description;
inserting at the source node, the session description pointer in a packet within the media stream of the active media session; and
transmitting the packet from the source node to a receiver node in the media session;
wherein the session description pointer is configured to allow an intermediate node located between the source node and the receiver node in the media session to obtain said session description, said session description comprising metadata for interpreting structure and content of the media stream at the intermediate node; and
wherein the back-map data is inserted in a Real-time Transport Protocol (RTP)/Real-time Transport Control Protocol (RTCP) stream.

2. The method of claim 1 wherein the session description pointer comprises a uniform resource identifier pointing to a network device containing said session description, the uniform resource identifier comprising a session initiation protocol uniform resource identifier pointing to a session participant containing said session description.

3. The method of claim 1 wherein the uniform resource identifier points to a server containing said session description.

4. The method of claim 1 wherein the uniform resource identifier comprises a Real-Time Streaming Protocol (RTSP) uniform resource locater.

5. The method of claim 1 wherein the packet comprises a media packet in the media stream.

6. The method of claim 5 wherein the media packet comprises a Real-time Transport Protocol (RTP) packet.

7. The method of claim 1 wherein the packet comprises a control packet in the media stream.

8. The method of claim 7 wherein the media session comprises a Real-time Transport Protocol (RTP) session and the control packet comprises a Real-time Transport Control Protocol (RTCP) packet for the RTP session.

9. An apparatus comprising:
a processor for processing a packet received from a source of a media session in a media stream and containing a session description pointer to a session description for the media session, transmitting a request for the session description using said session description pointer, and processing said session description for use in interpreting the media stream at an intermediate node located between the source and a receiver; and memory for storing said session description;

wherein said session description comprises metadata for interpreting structure and content of the media stream at the apparatus and the session description pointer comprises back-map data pointing from the media stream to said session description; and wherein the back-map data is inserted in a Real-time Transport Protocol (RTP)/Real-time Transport Control Protocol (RTCP) stream.

10. The apparatus of claim 9 wherein the session description pointer comprises a uniform resource identifier pointing to a network device containing said session description, the uniform resource identifier comprising a session initiation protocol uniform resource identifier pointing to a session participant containing said session description.

11. The apparatus of claim 9 wherein the uniform resource identifier comprises a Real-Time Streaming Protocol (RTSP) uniform resource locater and transmitting said request comprises transmitting an RTSP describe request.

12. The apparatus of claim 9 wherein the packet comprises a media packet in the media stream.

13. The apparatus of claim 12 wherein the media packet comprises a Real-time Transport Protocol (RTP) packet.

14. The apparatus of claim 9 wherein the packet comprises a control packet in the media stream.

15. The apparatus of claim 14 wherein the media session comprises a Real-time Transport Protocol (RTP) session and the control packet comprises a Real-time Transport Control Protocol (RTCP) packet for the RTP session.

16. An apparatus comprising:

a processor for constructing a session description pointer to a session description for a media session, inserting the session description pointer in a packet in a media stream of the media session, and transmitting the packet to a receiver node in the media session; and memory for storing said session description;

wherein the session description pointer is configured to allow an intermediate node located between the apparatus and the receiver node to obtain said session description, said session description comprising metadata for interpreting structure and content of the media stream at the intermediate node, the session description pointer comprising back-map data pointing from the media stream to said session description; and wherein the back-map data is inserted in a Real-time Transport Protocol (RTP)/Real-time Transport Control Protocol (RTCP) stream.

17. The apparatus of claim 16 wherein the packet comprises a media packet in the media stream.

18. The apparatus of claim 16 wherein the packet comprises a control packet in the media stream.

19. The apparatus of claim 16 wherein the session description pointer comprises a uniform resource identifier pointing to a network device containing said session description, the uniform resource identifier comprising a session initiation protocol uniform resource identifier pointing to a session participant containing said session description.

\* \* \* \* \*